M. TURLEY.

HORSE-COLLAR.

No. 7,711. Reissued May 29, 1877.

*Attest*

Ullman Strong.

Frederic Ullmann

INVENTOR

*Marshall Turley*

By F. F. Warner, his

*Attorney.*

N. PETERS, PHOTO-LITHOGRAPHER, WASHINGTON, D. C.

UNITED STATES PATENT OFFICE.

MARSHALL TURLEY, OF COUNCIL BLUFFS, IOWA.

IMPROVEMENT IN HORSE-COLLARS.

Specification forming part of Letters Patent No. 173,692, dated February 15, 1876; reissue No. 7,711, dated May 29, 1877; application filed March 13, 1877.

*To all whom it may concern:*

Be it known that I, MARSHALL TURLEY, of Council Bluffs, in the county of Pottawattamie, and in the State of Iowa, have invented certain new and useful Improvements in Horse-Collars; and do hereby declare the following to be a full, clear, and exact description thereof, reference being had to the accompanying drawings, and to the letters of reference marked thereon, making a part of this specification.

The nature of my invention consists in the construction and arrangement of a flexible hame-rim. I also aim, as a separate feature of my invention, to provide the rim with pads adjustable thereon, all of which will be hereinafter more fully set forth.

In order to enable others skilled in the art to which my invention appertains to make and use the same, I will now proceed to describe its construction and operation, referring to the annexed drawing, in which—

Figure 1:
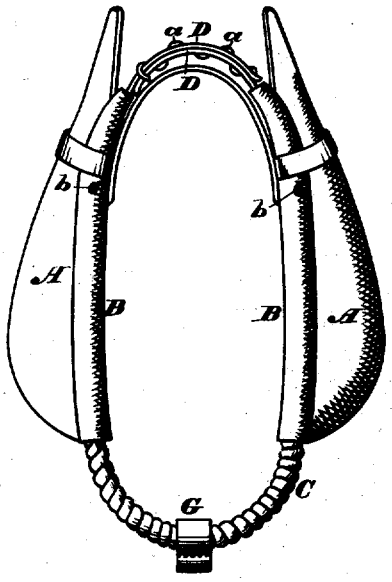
Figure 2:
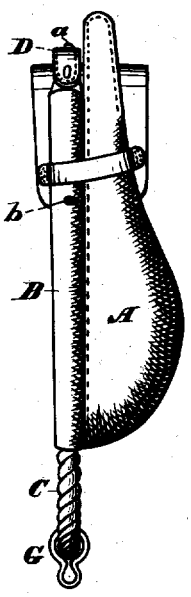

Figure 1 is a front view, and Fig. 2 a side view, of my horse-collar.

A A represent the pads of the horse-collar, constructed in any desired form or shape, and the covering extended along the inner edge of each pad, to form a flexible tube, B. Through these tubes is passed a rope, rubber tube, or its equivalent, C, the ends of said rope being, at the top of the collar, provided with straps D D, which are laced together, as shown. The collar thus constructed is flexible, so that it will shape itself to the neck of any horse. The pads which form the bulge or belly of the collar may be slipped up or down on the rope C, so that the draft or bearing of the collar will be on the right place of the shoulder, when the collar is made larger or smaller, as it can be, by altering the lacing *a* at the top. The pads are held in any desirable position on the rim C by screws *b b*. At the bottom of the collar is a loop, G, through which the hame-strap is to be passed, and which will prevent the hames from leaving the collar when backing. The collar is flexible and adjustable, so that it can be made to fit any horse, and the horse will not be liable to be chafed or injured from the collar.

It will be perceived, from reference to the drawing, and from the foregoing description, that the lower ends of the pads do not meet, but that the flexible part C extends between these ends, thus making the lower part of the collar flexible, and adapting it to yield readily to the movement of the horse's fore shoulders.

Having thus fully described my invention, what I claim as new, and desire to secure by Letters Patent, is—

1. A horse-collar wherein the pads do not meet each other at their lower ends, and are combined with a hame-rim having a rope foundation extending between the ends of the pads, for rendering the collar flexible, for the purposes set forth.

2. In a horse-collar, the pads A A, adjustable on a flexible rim, C, for the purposes herein set forth.

3. The combination of the flexible rim C, adjustable pads A A, straps D D, and lacing *a*, substantially as and for the purposes herein set forth.

4. The loop G, in combination with the flexible rim C and adjustable pads A A, for the purposes herein set forth.

MARSHALL TURLEY.

Witnesses:
F. F. WARNER,
ULMAN STRONG.